United States Patent Office 2,821,068
Patented Jan. 28, 1958

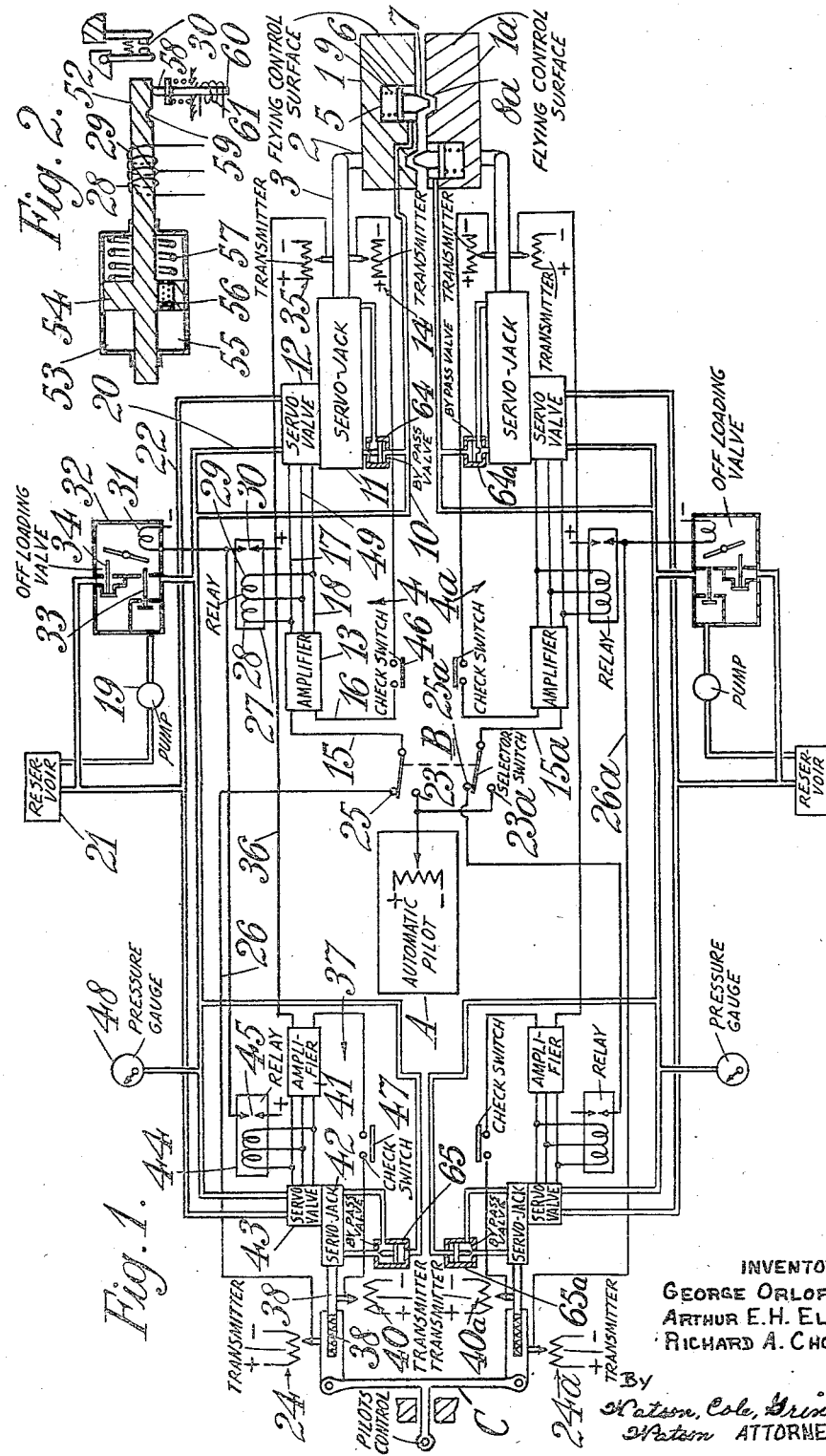

2,821,068

SERVO SYSTEMS

George Orloff, Arthur Ernest Henry Elmer, and Richard Abdiel Chorley, Gloucester, England, assignors to British Messier Limited, Gloucester, England, a British company Application February 9, 1956, Serial No. 564,521

Claims priority, application Great Britain February 9, 1955

16 Claims. (Cl. 60—97)

This invention relates to servo actuating systems and is concerned with those in which the actuating units are duplicated for safety reasons.

One of the difficulties encountered in duplicated servo systems is that of detecting which one of the two actuating units is faulty and of providing means capable of preventing the faulty unit from interfering with the operation of the system by the other unit. The present invention provides an arrangement for overcoming this difficulty.

According to the invention a servo actuating system comprises:

(a) Twin servo-units each having a movable output member, means for transmitting a duplicated control signal to the servo-units said control signal having a characteristic which is variable in accordance with the position required to be taken up by the output members, with a control arrangement for each servo-unit including means associated with the output member to produce a follow-up signal indicating the actual position of said member, means for receiving and comparing the control and follow-up signals and means acting in response to the lack of correspondence revealed by said comparison to cause working medium to act in the servo-unit and move the output member in a sense to reduce the difference between the actual position of said member as signalled by the follow-up signal and the required position signalled by the control signal, (b) Release means associated with each servo-unit for rendering the output member at least of said servo-unit freely movable in both working directions irrespective of the value or sense of the aforesaid difference indicated by the signal comparison, operation of said release means being initiated by said difference when the latter reaches a predetermined abnormal value, and (c) Operative connections between each of the output members and a part to be actuated, said operative connections permitting relative movement between the output members sufficient for the aforesaid difference between the actual position of the output member of one servo-unit and the required position of the said member to build up to the predetermined abnormal value while the difference between the actual position of the output member of the other servo unit and the required position of the said member remains within normal limits.

In the operation of the servo system according to the invention equal control signals are supplied to the signal-receiving means of both units, but if one unit fails to respond to such signal while the other unit does so respond (this differential action being possible by virtue of the relative movement permitted between the output members) the comparison of the control and follow-up signals will show a greater lack of correspondence in the faulty unit than in the sound one and this lack of correspondence will eventually reach a value which will actuate the release means associated with the faulty unit for rendering its output member freely movable in both directions. When this occurs the sound unit can continue to operate without interference from the faulty unit. Preferably in this condition the output members are locked together to eliminate the lost motion which would otherwise be present in the system.

In some applications it is possible to divide the part to be actuated into two sections, and in this case, according to a feature of the invention, each output member is connected to one of such sections and means are provided for locking the sections together, such means being actuated automatically to lock the sections together when one of the output members is rendered freely movable in both working directions.

Where it is not possible or convenient to divide the part to be actuated as above described, the output members may be connected to the said part by a differential system, means being provided for limiting and/or preventing the differential action, said preventing means, if present, being actuated to lock the output members together when one of said members is rendered freely movable in both working directions.

According to a further feature of the invention a servo system as defined in the third, fifth or sixth paragraph of this specification may be combined with a remote control station comprising an operator's control member and twin signal transmission means operable simultaneously by movement of the control member to transmit the duplicated control signal to the servo units.

Means may be provided whereby the control signal receiving means of the servo-units may be switched either to the signal transmitting means controlled by the operator's control member or to signal transmitting means controlled by an automatic device.

In a system as defined in the last preceding paragraph means may be provided for moving the operator's control member in accordance with movements of the part actuated when the system is under the control of said automatic device.

These and other features of the invention will be explained more fully in the following description of a particular example in which the invention is applied to an electro-hydraulic servo system for a flying control of an aircraft. The system is shown diagrammatically in the accompanying drawings, in which:

Figure 1 is a general lay out, and

Figure 2 shows a form of relay device that can be used therein.

In the drawings (Figure 1) two sections of an aircraft flying control surface to be actuated are shown at 1 and 1a respectively, and each section is connected to one half of a duplicated servo system. As the two halves of the servo system are identical it will be convenient in the description to refer to the corresponding parts by the same reference numeral but with suffix a for the half which is lowermost in the drawing. The same description will also apply to both halves.

Considering the uppermost half of the system, the control surface 1 is connected by suitable linkage 2 to the output member 3 of a servo-unit indicated generally by the reference 4. The section 1 of the control surface carries a hydraulic cylinder 5 containing a piston 6 from which a locking bolt 7 projects to engage a recess 8a in the section 1a of the control surface when the piston is moved downwardly by a spring 9. By admitting liquid under pressure through a pipe 10 into the lower chamber of the cylinder the locking bolt is withdrawn so that the control surface sections 1 and 1a are free to move relatively to one another. Such relative freedom need only extend through a small range and by making the locking bolts of tapered formation it can be arranged that the two sections of the control surface are brought into alignment with one another when the bolt is engaged.

In this example the servo unit comprises a hydraulic jack 11, the ram of which constitutes the output member 3, an electro-hydraulic control valve 12, an electrical amplifier 13 and an electrical follow-up transmitter 14 operated by the output member 3. The amplifier 13 receives an electrical control signal through a line 15 and an electrical follow-up signal through a line 16 and amplified signals are transmitted through lines 17 and 18 to the valve 12. This valve comprises a hydraulic control element moved by the differential action of two electrical windings of equal power (not shown) supplied by the lines 17 and 18, the line 49 being a common conductor carrying current equal to the sum or difference of the currents in the lines 17 and 18. It will be understood therefore that the hydraulic control element of the valve 12 is moved in direction and magnitude corresponding to the difference between the control signal and the follow-up signal. If it is desired to work with control and follow-up signals of different power, the power of the windings can be adjusted to compensate for this, or the amplifier 13 may be arranged to give equal outputs for different inputs from the lines 15 and 16.

The construction of the valve 12 may for example, be similar to that described in U. S. patent application No. 306,995, filed August 29, 1952, now Patent No. 2,775,254 granted December 25, 1956. Liquid put under pressure by a pump 19 is conveyed to the valve 12 by a pipe 20 and returned to a reservoir 21 by a pipe 22. Movement of the hydraulic control element of the valve in response to the difference between the control and follow-up signals permits an increase of pressure to be developed on that side of the jack piston necessary to move the piston in the direction bringing the follow-up signal toward equality with the control signal. The arrangement thus operates in a well known manner to maintain the position of the output member 3 in conformity with the control signal supplied through the line 15.

The two servo units 4 and 4a are supplied with equal control signals either from an automatic pilot A, when a selector switch B is set to connect the signal-receiving lines 15 and 15a respectively to switch terminals 23, 23a receiving the output of the automatic pilot, or from twin transmitters 24, 24a controlled by a manually operated input member C, when the switch B is set to connect lines 15 and 15a with contacts 25, 25a connected by lines 26, 26a with the transmitters 24, 24a. It will be clear that the transmitters 24, 24a and the automatic pilot A may be located in any convenient position, possibly remote from the servo units 4 and 4a.

The pipe 10 from the lock cylinder 5 is connected to the pipe 20 from the pump 19 so that in the event of loss of hydraulic pressure in the pipe 20, which would render the servo-unit 4 inoperative, the locking bolt 7 engages the recess 8a and locks the two parts of the control surface together. At the same time a pressure-operated by-pass valve 64 opens communication between opposite ends of the jack cylinder 11 so that the output member 3 is free to move in both working directions. Thus both parts 1 and 1a of the control surface can continue to be operated by the servo-unit 4a.

To detect a fault in the servo unit 4 itself, which fault prevents displacement of the output member 3 in proper response to the control signal supplied to the line 15, a relay 27 is provided having windings 28 and 29 differentially energised from the lines 17 and 18 so as to close contacts 30 when the difference between the control signal carried by the line 17 and the follow-up signal carried by the line 18 exceeds the greatest steady difference occurring during normal working of the system. Since harmless transient signal differences of higher intensity may occur during normal working, the relay 27 preferably includes a delay-action device adequate to prevent closing of the contacts 30 by such transients. The delay-action device should be of a kind in which timing starts on reaching a critical level of energisation and which has a rapid re-setting action when the energisation falls below this level. The contacts, once closed, should also remain closed until reset by hand after the fault in the servo-unit has been put right.

A delay action device with these characteristics can be constructed as follows (Figure 2):

The differential windings 28 and 29 surround a common armature rod 52, which rod moves axially endwise through the windings as the maximum permissible difference between the signals in the two windings is reached. If said difference is maintained, one end of the rod eventually reaches and closes the relay contacts 30, but to avoid closing of the contacts under the effect of the aforesaid transient signal differences the rod is retarded in its travel by a dashpot device 53. The dashpot consists of a piston 54 on the opposite end of the rod 52 working in an oil filled cylinder 55, oil being transferred from one cylinder chamber to the other through a one-way restrictor 56 in the piston when the armature rod moves. A return spring 57 is provided inside the cylinder, bearing on the piston 54 to urge the armature rod 52 away from the relay contacts 30. When the armature rod under the control of the windings 28, 29 has moved far enough against the action of the return spring 57 to close the relay contacts, a spring loaded latch 58 engages in a recess 59 in the side of the rod 52 and thereby prevents it from returning and allowing the relay contacts to open although the energising current to the relay windings 28, 29 be varied or cut off. The latch has a tail portion 60 forming a further armature rod surrounded by an energising coil 61, so that the latch can be withdrawn at will by operation of an electrical control, after the fault in the system has been rectified. This device is only one method of providing a delayed action relay, and any other suitable device, not necessarily hydraulic, which will serve the same purpose may be used instead.

Closing of the contacts 30 causes energisation of the winding 31 of an electromagnetically operated off-loading valve 32 which comprises a normally open valve member 33 in circuit between the pump 19 and the pressure supply pipe 20 and a normally closed valve member 34 in circuit between the pressure supply pipe and the reservoir 21. Energisation of the winding 31 reverses these valve members so that the pressure supply pipe 20 is cut off from the pump 19 and connected to the reservoir 21. The pressure in the pipe 20 consequently falls to that of the reservoir 21 so that, in the manner already described, the bolt 7 is projected to lock the parts 1 and 1a of the control surface together and the pressure-operated by-pass valve opens communication between opposite ends of the jack cylinder 11. Both parts of the control surface can then continue to be operated by the servo-unit 4a. Energisation of the winding 31 or of another relay device in parallel with it may also be arranged to disconnect the electrical power supply from the faulty half of the system.

In the specification accompanying United States application Serial No. 557,174, filed January 3, 1956 there is described a servo system controlled alternatively by manual and automatic means in which means are provided for moving the manual control member in response to movements of the actuated part when the system is under automatic control. An arrangement of this kind is preferably included in the present system, and as shown in the drawings (Figure 1) comprises a signal transmitter 35 operated by the output member 3 and connected by a line 36 to a servo-unit 37 which is similar in all respects to the servo-unit 4 except that it need only be of sufficient power to move the manual input member C, to which its output member 38 is connected through a spring 39. The unit 37 thus includes a follow-up transmitter 40 operated by the output member 38, an amplifier 41, a jack cylinder 42 with a bypass valve 65, and an electro-hydraulic control valve 43. To detect faults in the servo unit 37 it is also provided with a relay 44 similar to the relay 27. Closing of the contacts 45 of the relay 44 is arranged to energise the winding 31 of the off-loading valve 32 so that the whole of the upper most half of the duplicated system is put out of operation as already described. If desired, however, separate off-loading valves may be associated with the servo units 4 and 37 so that only that servo unit which is faulty is put out of operation.

To enable the operation of the system to be checked prior to flight, switches 46 and 47 are provided in the follow-up signal lines of the servo-units. When either of these switches is opened and the manual input member C is moved, the control signal will not be progressively opposed by the follow-up signal, so that the relay 27 or 44, according to whether the switch 46 or 47 has been opened, will be energised to release the pressure in the supply pipe 20, as indicated by the reading of a pressure gauge 48. The parts 1 and 1a of the control surface should then become locked together, and this can be checked by observing that they follow the movements of the input member together.

In the system so far described it has been assumed that the cylinders 11 and 42 of the servo-units 4 and 37 are permanently fixed in relation to supporting structure. However, by attaching these parts to the fixed structure in a releasable manner, controlled by the fault-detecting relays 27 and 44, a further measure of safety against mechanical seizure of the jacks can be obtained. A suitable anchoring device for this purpose is described in the specification accompanying British patent application No. 33,479/54. This specification also describes an alternative construction embodying mechanical transmission members and mechanically operated control valves for the jacks whereby the basic principle of the present invention may be carried out.

We claim:

1. A servo actuating system comprising: (a) twin servo units each having a movable output member, means for transmitting a duplicated control signal to the servo units said control signal having a characteristic which is variable in accordance with the position required to be taken up by the output members, with a control arrangement for each servo unit including means associated with the output member to produce a follow-up signal indicating the actual position of said member, means for receiving and comparing the control and follow-up signals and means acting in response to the lack of correspondence revealed by said comparison to cause working medium to act in the servo unit and move the output member in a sense to reduce the difference between the actual position of said member as signalled by the follow-up signal and the required position signalled by the control signal, (b) release means associated with each servo unit for rendering the output member at least of said servo unit freely movable in both working directions irrespective of the value or sense of the aforesaid difference indicated by the signal comparison, operation of said release means being initiated by said difference when the latter reaches a predetermined abnormal value, and (c) operative connections between each of the output members and a part to be actuated, said operative connections permitting relative movement between the output members sufficient for the aforesaid difference between the actual position of the output member of one servo unit and the required position of the said member to build up to the predetermined abnormal value while the difference between the actual position of the output member of the other servo unit and the required position of the said member remains within normal limits.

2. A system as claimed in claim 1, wherein means are provided for locking the output members together to move as one when one of the output members is rendered freely movable by its associated release means.

3. A system as claimed in claim 1, wherein the part to be actuated is in two independently movable sections, one operatively connected to one of the output members and the other to the other output member, and means are provided for locking the sections together to move as one said means being actuated automatically when one of the output members is rendered freely movable by its associated release means.

4. A system as claimed in claim 1 wherein the servo units comprise fluid-pressure-actuated piston-and-cylinder units or jacks and the release means of each acts to cut off the fluid pressure to the jack, and to allow free passage between one side of the jack piston and the other.

5. A system as claimed in claim 4, wherein each jack has an electrically-operated control valve for controlling the admission and exhaust of pressure fluid, the control and follow-up signals being electrical and employed (after amplification if necessary) to actuate said valve, and the release means comprises an electrically-operated release valve serving to disconnect pressure fluid from the control valve and to connect it with exhaust.

6. A system as claimed in claim 5 wherein a differential electrical relay is provided to control the supply of operating current to the release valve, and lines feeding the control and follow-up signals to the jack control valve serve to energize said relay.

7. A system as claimed in claim 1, including a remote control station comprising an operator's control member and twin signal transmission means operable simultaneously by movement of the control member to transmit the duplicated control signal to the servo units.

8. A system as claimed in claim 7, including an automatic device (such as an automatic pilot) capable of transmitting the duplicated control signal, and switch means operable to connect the servo units for control by the automatic device instead of by the operator's control member.

9. A system as claimed in claim 8 wherein means are provided for automatically moving the operator's control member in accordance with the movements of the part to be actuated when the automatic device is in use.

10. A system as claimed in claim 9, wherein the means for automatically moving the operator's control member comprise twin auxiliary servo-units at the remote control station, one corresponding to each of the aforesaid main servo units and each having a movable output member operatively connected to said control member, means for transmitting to each auxiliary servo unit a signal indicating the position of the output member of the corresponding main servo unit, and a control arrangement of each auxiliary servo unit including means associated with the output member thereof to produce a follow-up signal indicating the actual position of said member, means for receiving and comparing said follow-up signal and the signal from the output member of the main servo unit, and means acting in response to the lack of correspondence revealed by said comparison to cause working medium to act in the auxiliary servo unit and move its output member in a sense to reduce any difference between the actual position of said member, as signalled by its follow-up signal and the required position that corresponds to the instant actual position of the output member of the corresponding main servo unit as signalled from said main servo unit.

11. A system as claimed in claim 10, including release means associated with each auxiliary servo unit for rendering at least the output member thereof freely movable in both working directions irrespective of the value or sense of the positional difference indicated by the comparison of the follow-up signal of said member and the signal from the corresponding main servo unit, operation of said release means being initiated by said difference when the latter reaches a predetermined abnormal value, and wherein the operative connections between the output members of the auxiliary servo units and the operator's control member are such as to permit relative movement between said output members sufficient for the aforesaid predetermined abnormal value to be reached by the output member of one auxiliary servo unit while the difference between the actual position of the output member of the other auxiliary servo unit and the required position of the said member remains within normal limits.

12. A system as claimed in claim 11, wherein the auxiliary servo units comprise fluid-pressure-actuated piston-and-cylinder units or jacks and the release means of each acts to cut off the fluid pressure to the jack, and to allow free passage between one side of the jack piston and the other.

13. A system as claimed in claim 12 wherein the jack of each auxiliary servo unit has an electrically-operated control valve for controlling the admission and exhaust of pressure fluid, the two signals received for comparison in the control arrangement of said servo unit being electrical and employed (after amplification if necessary) to actuate said valve, and the release means for the unit comprises an electrically-operated release valve serving to disconnect pressure fluid from said control valve and to connect it with exhaust.

14. A system as claimed in claim 13, wherein a differential electrical relay is provided to control the supply of operating current to the release valve of the auxiliary servo unit, and lines feeding the electrical signals to the jack control valve of said unit serve to energize said relay.

15. A system as claimed in claim 1, wherein for the purpose of testing, manually-operable means are provided for interrupting each of the transmissions conveying the follow-up signals of the servo units.

16. A system as claimed in claim 3, wherein the servo units comprise fluid-pressure actuated piston-and-cylinder units or jacks and the release means of each acts to cut off the fluid-pressure to the jack, and to allow free passage between one side of the jack piston and the other, and the locking means for the sections of the part to be actuated comprise twin locking members both spring-urged toward engagement but held out of engagement normally by fluid pressure acting independently on twin lock-control pistons one for each locking member, the fluid pressure supply for one lock control piston being taken from the supply to one jack and that for the other piston from the supply to the other jack so that whenever one of the jacks has its fluid pressure supply cut off by the associated release means or due to some failure one or other of the locking members becomes engaged.

References Cited in the file of this patent

UNITED STATES PATENTS

| | | |
|---|---|---|
| 2,597,361 | Mott | May 20, 1952 |
| 2,597,420 | Westbury | May 20, 1952 |
| 2,616,264 | Grant | Nov. 4, 1952 |
| 2,721,447 | Hancock | Oct. 25, 1955 |

FOREIGN PATENTS

| | | |
|---|---|---|
| 670,352 | Great Britain | Apr. 16, 1952 |